US011050589B1

(12) United States Patent
Roy et al.

(10) Patent No.: US 11,050,589 B1
(45) Date of Patent: Jun. 29, 2021

(54) SYSTEMS AND METHODS FOR A SHORT NULL DATA PACKET TRANSMISSION SCHEME IN A WIRELESS NETWORK (71) Applicant: Marvell International Ltd., Hamilton (BM)

(72) Inventors: Sayak Roy, Kolkata (IN); Ankit Sethi, Pune (IN); Sudhir Srinivasa, Los Gatos, CA (US); Hongyuan Zhang, Fremont, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 30 days.

(21) Appl. No.: 16/261,116

(22) Filed: Jan. 29, 2019

Related U.S. Application Data (60) Provisional application No. 62/646,778, filed on Mar. 22, 2018.

(51) Int. Cl.
| | | |
|---|---|---|
| *H04L 25/02* | (2006.01) | |
| *H04L 5/00* | (2006.01) | |
| *H04B 7/0417* | (2017.01) | |
| *H04L 27/20* | (2006.01) | |
| *H04B 7/0452* | (2017.01) | |
| *H04L 27/26* | (2006.01) | |
| *H04W 84/12* | (2009.01) | |

(52) U.S. Cl.
CPC ....... *H04L 25/0204* (2013.01); *H04B 7/0417* (2013.01); *H04L 5/0048* (2013.01); *H04L 27/2032* (2013.01); *H04B 7/0452* (2013.01); *H04L 27/2647* (2013.01); *H04W 84/12* (2013.01)

(58) Field of Classification Search
CPC .............. H04L 25/0204; H04L 5/0048; H04L 27/2032; H04L 27/2647; H04B 7/0417; H04B 7/0452; H04W 84/12
See application file for complete search history.

(56) References Cited

U.S. PATENT DOCUMENTS

| 9,078,153 B1 * | 7/2015 | Schelstraete ......... H04B 7/0626 |
|---|---|---|
| 2012/0058735 A1 * | 3/2012 | Vermani ................. H04L 5/006 455/69 |
| 2015/0295629 A1 * | 10/2015 | Xia ...................... H04B 7/0695 370/329 |
| 2016/0127019 A1 * | 5/2016 | Schelstraete ......... H04B 7/0417 370/252 |

(Continued)

OTHER PUBLICATIONS

Lacoste, R., "The Darker Side, Chapter 13: Digital Modulations Demystified", Jan. 2010, Newnes, Total p. 21 (Year: 2010).*

*Primary Examiner* — Un C Cho
*Assistant Examiner* — Shah M Rahman (57) ABSTRACT

Embodiments described herein provide a method for null data packet transmission. An information symbol is obtained for transmission in a null data packet. A set of tones for transmitting the information symbol is obtained and divided into a first subset of tones and a second subset of tones. A first value is transmitted over the first subset of tones and a second value is transmitted over the second subset of tones to indicate a feedback information bit of zero from the information symbol. A third value is transmitted over the first subset of tones and a fourth value is transmitted over the second subset of tones to indicate a feedback information bit of one from the information symbol.

6 Claims, 7 Drawing Sheets

(56) References Cited

U.S. PATENT DOCUMENTS

| | | | |
|---|---|---|---|
| 2016/0165589 A1* | 6/2016 | Chu | H04W 72/0413 |
| | | | 370/329 |
| 2016/0323424 A1* | 11/2016 | Merlin | H04L 5/0048 |
| 2016/0330732 A1* | 11/2016 | Moon | H04B 7/0617 |
| 2017/0063438 A1* | 3/2017 | Baik | H04L 5/0023 |
| 2017/0070914 A1* | 3/2017 | Chun | H04L 1/0025 |
| 2017/0093600 A1* | 3/2017 | Li | H04L 5/0037 |
| 2017/0105215 A1* | 4/2017 | Li | H04B 7/0456 |
| 2017/0111148 A1* | 4/2017 | Park | H04L 1/0026 |
| 2017/0156148 A1* | 6/2017 | Park | H04L 5/0048 |
| 2017/0170939 A1* | 6/2017 | Huang | H04L 5/0025 |
| 2017/0264403 A1* | 9/2017 | Montreuil | H04L 5/0007 |
| 2018/0205441 A1* | 7/2018 | Asterjadhi | H04W 72/0413 |
| 2018/0205519 A1* | 7/2018 | Vermani | H04L 27/30 |
| 2018/0323837 A1* | 11/2018 | Park | H04L 25/02 |
| 2019/0165883 A1* | 5/2019 | Chun | H04L 1/0026 |
| 2019/0190752 A1* | 6/2019 | Chen | H04L 5/0094 |
| 2019/0349232 A1* | 11/2019 | Cariou | H04L 5/0053 |

* cited by examiner

SYSTEMS AND METHODS FOR A SHORT NULL DATA PACKET TRANSMISSION SCHEME IN A WIRELESS NETWORK

CROSS-REFERENCE TO RELATED APPLICATION

This disclosure claims the benefit under 35 U.S.C. § 119(e) of U.S. Provisional Patent Application No. 62/646,778, filed on Mar. 22, 2018, which is hereby incorporated by reference herein in its entirety.

FIELD OF USE

This disclosure relates to null data packet (NDP) transmission in a wireless local area network (WLAN), and specifically, to a NDP transmission scheme without using an uplink orthogonal frequency-division multiple access (UL-OFDMA) scheme with payload symbols.

BACKGROUND OF THE DISCLOSURES

Access points (APs) in WLANs sometimes require small amounts of information (i.e., typically a few bits) from client stations to provide information such as feedback about channel occupancy and availability at a station, feedback indicating whether a client has data to send, power efficiency information, etc. The exchange of such information between the client stations and the AP can often be frequent. Thus, existing uplink orthogonal frequency-division multiple access (UL-OFDMA) transmission schemes with High Efficiency Long Training Fields (HELTFs) and payload OFDM symbols can be inefficient, given the complexity of encoding and modulation required by the UL-OFDMA, and the small amount of information to be transmitted.

SUMMARY

Embodiments described herein provide methods and systems for null data packet transmission. An information symbol is obtained for transmission in a null data packet. In some embodiments, an information symbol may or may not be preceded by long training fields for channel estimation. A set of tones for transmitting the information symbol is obtained and divided into a first subset of tones and a second subset of tones. A first value is transmitted over the first subset of tones and a second value is transmitted over the second subset of tones to indicate an information bit of zero from the information symbol. A third value is transmitted over the first subset of tones and a fourth value is transmitted over the second subset of tones to indicate an information bit of one from the information symbol.

In some embodiments, where the first subset and the second subset have a same number of tones, a value of one is transmitted over the first subset of tones and a value of minus one is transmitted over the second subset of tones when an information bit from the information symbol is zero. A value of minus one is transmitted over the first subset of tones and a value of one is transmitted over the second subset of tones when the information bit from the information symbol is one.

In some embodiments, two or four information symbols are adopted. The first subset of tones is allocated on a first information symbol to transmit a first value and the second subset of tones is allocated on a second information symbol to transmit a second value.

In some embodiments, the first subset of tones or the second subset of tones have different tone locations among the plurality of tones on different information symbols.

In some embodiments, the information symbol is modulated onto the plurality of tones using on-off keying, where a value of one is transmitted over the first subset of tones and a value of zero is transmitted over the second subset of tones when an information bit from the information symbol is zero, and a value of zero is transmitted over the first subset of tones and a value of one is transmitted over the second subset of tones when the information bit from the information symbol is one.

In some embodiments, the first subset of tones is divided into a first sub-subset and a second sub-subset and the second subset of tones into a third sub-subset and a fourth sub-subset. When an information bit from the information symbol is zero, a value of one is transmitted over the first sub-subset of tones, a value of zero is transmitted over the second sub-subset of tones, a value of zero is transmitted over the third sub-subset of tones, and a value of one is transmitted over the fourth sub-subset of tones. When the information bit from the information symbol is one, a value of zero is transmitted over the first sub-subset of tones, a value of one is transmitted over the second sub-subset of tones, a value of one is transmitted over the third sub-subset of tones, and a value of zero is transmitted over the fourth sub-subset of tones.

In some embodiments, the information symbol is modulated onto the plurality of tones using differential binary phase-shift keying, where a value of one is transmitted over the first subset of tones and a value of one is transmitted over the second subset of tones when an information bit from the information symbol is zero, and a value of one is transmitted over the first subset of tones and a value of minus one is transmitted over the second subset of tones when the information bit from the information symbol is one.

In some embodiments, a third subset of tones that are sparsely distributed across the plurality of tones is allocated. A known sequence is transmitted over the third subset of tones for noise estimation.

In some embodiments, where the first subset of tones and the second subset of tones are both loaded on the information symbol, a value of 0.5 is transmitted over the first subset of tones and a value of 0.5 is transmitted over the second subset of tones when an information bit from the information symbol is zero. A value of one is transmitted over the first subset of tones and a value of zero is transmitted over the second subset of tones when the information bit from the information symbol is one.

In some embodiments, where the first subset of tones or the second subset of tones are arbitrarily distributed among the plurality of tones, the first subset of tones is assigned to transmit the information bit of zero and the second subset of tones is assigned to transmit the information bit of one.

In an embodiment of the present disclosure, a network device is provided for null data packet transmission in a wireless local area network. The network device includes memory. The network device also includes a processor configured to obtain an information symbol for transmission in a null data packet, obtain a set of tones for transmitting the information symbol, and divide the set of tones into a first subset of tones and a second subset of tones. The network device also includes a wireless transceiver configured to transmit a first value over the first subset of tones and a second value over the second subset of tones to indicate an information bit of zero from the information symbol and transmit a third value over the first subset of tones and a fourth value over the second subset of tones to indicate an information bit of one from the information symbol.

In an embodiment of the present disclosure, a signal transmitted over a plurality of tones having a first subset of tones and a second subset of tones is received from a wireless channel. A first subset of values received over the first subset of tones and a second subset of values received over the second subset of tones are determined. A first metric is computed based at least in part on the first subset of values. A norm square metric is computed. A decision value that the signal represents is generated based at least in part on the first metric and the norm square metric.

In some embodiments, a respective channel coefficient is obtained over each tone of the plurality of tones. Computing the first metric relating to the first subset of values includes, for each tone in the first subset, computing a respective real component of a product of a respective value received over the respective tone and a conjugate of the respective channel coefficient of the respective tone, and summing the computed real components over the first subset of tones.

In some embodiments, a second metric is computed based on the second subset of values. A difference between the first metric and the second metric is computed. The norm square metric of channel coefficients corresponding to tones from the first subset is computed. The norm square metric is compared with the difference between the first metric and the second metric. The decision value of zero or one is generated depending on whether the norm square metric is greater than the difference between the first metric and the second metric.

In some embodiments, an overlapping set from the first subset and from the second subset is determined, where each pair of tones from the overlapping set has a first tone from the first subset and a second tone from the second subset, and the first tone and the second tone have same channel coefficients. For each tone pair from the overlapping set, a respective real component of a product of a conjugate of a first value of a respective first tone and a second value of a respective second tone is computed. The computed respective real components are summed over the overlapping set of tones.

In some embodiments, the norm square metric of values received over the first subset of tones is computed. The first metric is compared with the norm square metric. The decision value of zero or one is generated depending on whether the norm square metric is greater than the first metric.

In some embodiments, the first metric relating to the first subset of values is computed by computing a first sum of power of difference of values received over the first subset of tones and the second subset of tones.

In some embodiments, where the norm square metric includes a first pre-defined threshold and a second pre-defined threshold, the decision value of zero is generated when the first sum is less than the first pre-defined threshold, and the decision value of one is generated when the first sum is greater than the second pre-defined threshold.

In some embodiments, a band-stop filter is applied to the received signal to rule out spurious signal components.

In some embodiments, when two information symbols are used, a power metric is computed based on a median value of power components on each tone from the plurality of tones such that effects of spurious signals from certain tones are reduced.

In some embodiments, one or more data samples from the first subset of values that have a spurious magnitude while computing the first metric are excluded.

In an embodiment of the present disclosure, a network device is provided for null data packet transmission in a wireless local area network. The network device includes memory. The network device also includes a wireless transceiver configured to receive, from a wireless channel, a signal transmitted over a plurality of tones having a first subset of tones and a second subset of tones. The network device also includes a processor configured to determine a first subset of values received over the first subset of tones and a second subset of values received over the second subset of tones, compute a first metric based at least in part on the first subset of values, compute a norm square metric, and generate a decision value that the signal represents based at least in part on the first metric and the norm square metric.

BRIEF DESCRIPTION OF THE DRAWINGS

Further features of the disclosure, its nature and various potential advantages will become apparent upon consideration of the following detailed description, taken in conjunction with the accompanying drawings, in which like reference characters refer to like parts throughout, and in which.

DETAILED DESCRIPTION

In view of the problem of uplink transmission of small amounts of feedback information in WLANs, embodiments described herein provide a transmission scheme that uses a short null data packet (NDP) frame to transmit such feedback information without UL-OFDMA payload symbols.

A NDP feedback report procedure has been proposed in 802.11ax for a high-efficiency (HE) AP to collect small amounts of feedback information from a large number of HE client stations. The feedback information (e.g., resource requests, etc.) is usually sent without data payloads in response to a trigger frame from the AP. Specifically, the available bandwidth is divided into multiple groups of pre-defined tone sets, each of which has L tones. Thus, each client station can signal their own information on one particular tone set that is pre-assigned to the client station by the AP. Within each tone set, half the tones (L/2 tones) are loaded, and the other half (L/2 tones) are unloaded. Specifically, half of the tones (L/2) assigned for the bit of 0 are adjacent to the other half of L/2 tones assigned to the bit of 1. The receiver computes and compares the total received power over the first half of the tones designated for 0 and the second half of the tones designated for 1 to determine whether a bit of 0 or 1 was transmitted depending on which tone set has the higher power. For example, when L=12 tones are used, with a bandwidth of 20 MHz (242 tones), a maximum of 18 client stations per HELTF symbol can be supported.

In this specific proposed NDP scheme, the feedback information is not for channel sounding. In addition, the interference tolerance of this specific proposed NDP scheme is insufficient, especially when high power spurs due to harmonics on-chip are present.

Embodiments described herein provide an alternative mechanism to transmit feedback information uplink within a short NDP packet. Specifically, power based signaling is used to transmit the small amount of feedback information, e.g., 1 or 2 bits through the information symbol. Various implementations of HELTF modulation for generating the information symbol are described below in relation to FIGS. 1-6.

Figure 1:
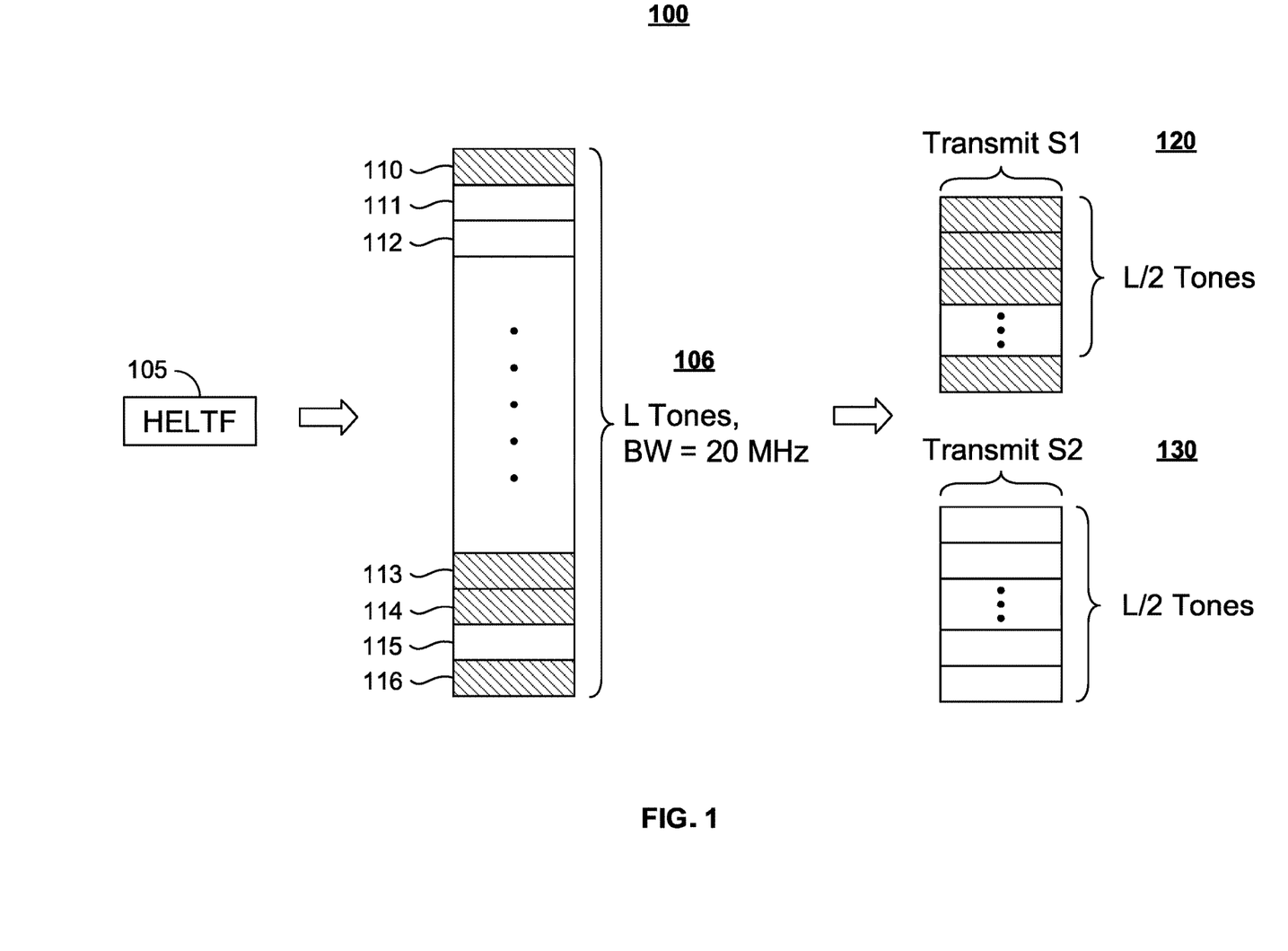
FIG. 1 provides a block diagram illustrating aspects of null data packet transmission without UL-OFDMA, having payload symbols according to an embodiment described herein.

FIG. 1 provides a block diagram illustrating aspects of null data packet transmission without UL-OFDMA payload, according to an embodiment described herein. Diagram 100 shows the transmission of one or more information symbols 105 over a set of L tones 106. The total bandwidth of 20 MHz may be divided into a set of L tones 106. The set of L tones may be divided into two subsets of tones, e.g., tones 110, 113, 114, 116, etc. may belong to a first subset, while tones 111, 112, 115, etc. may belong to a second subset. The distribution of tones between the two subsets may be arbitrary such that tones in either subset do not need to be sequential tones. The first subset of tones may be used to transmit a value of S1, and the second subset of tones may be used to transmit a value of S2. A different combination of {S1, S2} may be chosen under a different modulation scheme to indicate feedback information of 0 or 1, e.g., {S1, S2}={1, 0}, {+1, −1}, etc.

In some embodiments, instead of placing the subset of tones assigned to transmit the value of S1 adjacent to the subset of tones assigned to transmit the value of S2 as proposed by existing 802.11 standard, the first subset of L/2 tones assigned to a bit of 0 can be placed not adjacent to the second subset of the other L/2 tones assigned to a bit of 1. Each of these (L/2) tone sets can occupy any position.

For example, a first subset of L/2 tones assigned to transmit the value of S1 can be evenly spread out among the L tones, and separated by 36 tones. The tones of the second subset of L/2 tones are also similarly spread out but are not adjacent to the first subset. In this way, any tone from the first subset is offset by $T_{offset}$ number of tones to the closest tone from the second subset. For example, $T_{offset}$=18 and L=12.

FIGS. 2-6 show example logic flow diagrams illustrating various aspects of null data packet transmission in a WLAN, according to embodiments described herein. Processes 200-600 may be implemented at a wireless communication device (705 in FIG. 7) that is operated in compliance with the 802.11 standard, e.g., 802.11ax, 802.11az, etc.

Figure 2:
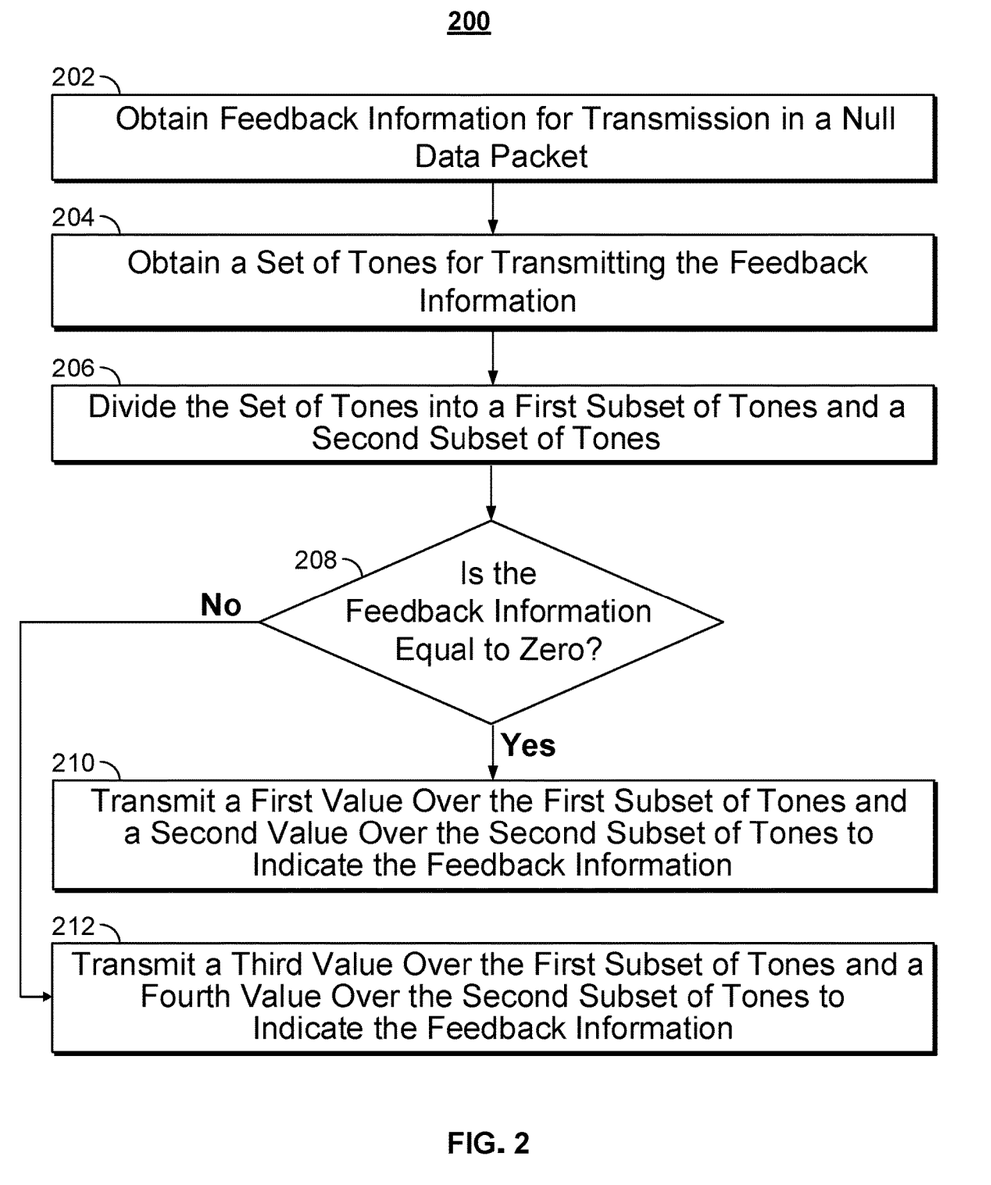
FIG. 2 provides an example logic flow diagram illustrating aspects of transmitting an information symbol in a NDP packet to indicate feedback information without payload data, according to embodiments described herein.

FIG. 2 provides an example logic flow diagram illustrating aspects of transmitting an information symbol in a NDP packet to indicate feedback information without payload data, according to embodiments described in FIG. 1. In diagram 200, at 202, a client station is configured to obtain the HELTF symbol for transmission in a null data packet. For example, the HELTF symbol is modulated to carry the feedback information (1 or 2 bits) to be transmitted to the AP.

At 204, the client station is configured to obtain a set of tones for transmitting the HELTF symbol. For example, the number of tones is chosen depending on or influences directly the number of users to be supported. When a set of L=12 tones are used, for a bandwidth of 20 MHz (242 tones), a maximum of 18 users (sets of tones) may be supported.

In some embodiments, in order to improve robustness, two or more HELTFs are transmitted, with each user transmitted on multiple HELTFs with an LTF mapping, e.g., by using a P matrix. Alternatively, the multiple HELTFs may be modulated in an identical way with the first HELTF symbol or the first HELTF may be modulated to serve as reference for subsequent HELTFs which carry feedback information.

At 206, the transmitter is configured to divide the set of tones into a first subset $set_1$ of tones and a second subset $set_2$ of tones, with an equal number of tones in each subset. For example, the exact tones in a subset can be arbitrary and may not be sequential tones.

At 208, if the feedback information is equal to zero, the client station is configured, at 210, to transmit a first value over the first subset $set_1$ of tones and a second value over the second subset $set_2$ of tones to indicate a data bit value of zero from the feedback information. Or alternatively, at 212, the transmitter is configured to transmit a third value over the first subset $set_1$ of tones and a fourth value over the second subset $set_2$ of tones to indicate a data bit value of one from the feedback information.

In some embodiments, additional signaling may be used to help the receiver measure the reference noise power. For example, an additional HELTF symbol can be transmitted where certain tones (depending on the tone map in the information-HELTF) are loaded with a known sequence.

The configuration of the first, second, third, and fourth values over $set_1$ and $set_2$ may vary per different modulation schemes as described below:

In some embodiments, under orthogonal tone sequence modulation, when feedback information of 0 is to be indicated via the HELTF symbol, a value of +1 is transmitted over the first subset $set_1$ of tones and a value of −1 is transmitted over the second subset $set_2$ of tones; and when feedback information of 1 is to be indicated via the HELTF symbol, a value of −1 is transmitted over the first subset $set_1$ of tones and a value of +1 is transmitted over the second subset $set_2$ of tones.

In another example, when feedback information of 0 is to be indicated via the HELTF symbol, a value of +0.5 is transmitted over the first subset $set_1$ of tones and a value of +0.5 is transmitted over the second subset $set_2$ of tones; and when feedback information of 1 is to be indicated via the HELTF symbol, a value of +1 is transmitted over the first subset $set_1$ of tones and a value of 0 is transmitted over the second subset $set_2$ of tones. In this case, the $set_1$ tones and the $set_2$ tones are loaded onto the same HELTF symbol.

Figure 3:
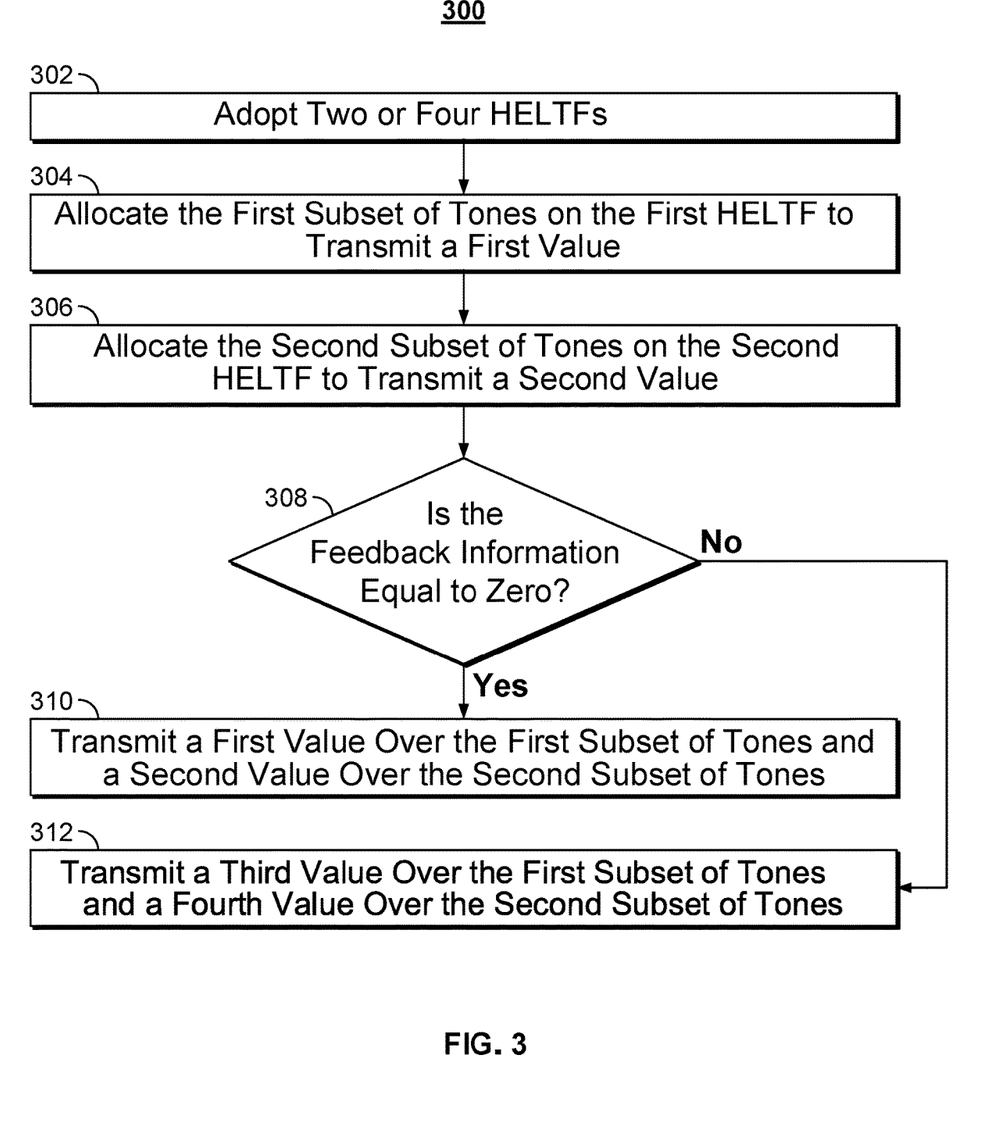
FIG. 3 provides an example logic flow diagram illustrating loading subsets of tones to different HELTFs when 2 or 4 HELTFs are used, according to embodiments described herein.

FIG. 3 provides an example logic flow diagram illustrating a process 300 for loading subsets of tones to different HELTFs, according to embodiments described herein. At 302, the client station is configured to adopt two or four HELTFs.

At 304, the client station is configured to allocate the first subset $set_1$ of tones to a first HELTF symbol. At 306, the client station is configured to allocate the second subset $set_2$ of tones to a second HELTF. In this way, the HELTFs alternate between $set_1$ tones and $set_2$ tones, e.g., all $set_1$ tones are loaded on $LTF_{2m+1}$ and all $set_2$ tones are loaded on $LTF_{2m+2}$, where m={0, 1, 2, . . . }. Different tone locations for $set_1$ and $set_2$ on different HELTFs help to enhance frequency diversity.

The client station may then indicate feedback information in each HELTF symbol under an on-off keying scheme. When feedback information of 0 is to be indicated via the HELTF symbol at 308, a value of +1 is transmitted over the first subset $set_1$ of tones and a value of 0 is transmitted over the second subset $set_2$ of tones, at 310. When feedback information of 1 is to be indicated via the HELTF symbol at 308, a value of 0 is transmitted over the first subset $set_1$ of tones and a value of +1 is transmitted over the second subset $set_2$ of tones, at 312. The assignment of values over $set_1$, and $set_2$ may be alternated for different users such that 0s and 1s can be evenly distributed between multiple HELTFs.

In some embodiments, the first and second subsets may be further divided into sub-subsets. For example, the first subset $set_1$ may be divided into a first sub-subset $set_{1a}$ and a second sub-subset $set_{1b}$, and the second subset $set_2$ may be divided into a third sub-subset $set_{2a}$ and a fourth sub-subset $set_{2b}$. Under on-off keying modulation, when feedback information of 0 is to be indicated via the HELTF symbol, values of +1, 0, 0, +1 are to be transmitted over the sub-subsets $set_{1a}$, $set_{1b}$, $set_{2a}$, $set_{2b}$ of tones, respectively; and when feedback information of 1 is to be indicated via the HELTF symbol, values of 0, +1, +1, 0 are to be transmitted over the sub-subsets $set_{1a}$, $set_{1b}$, $set_{2a}$, $set_{2b}$ of tones, respectively. In this way, when multiple HELTFs are to be transmitted, the loaded tones are efficiently distributed between the HELTFs.

In another example, under differential binary phase-shift keying (D-BPSK) modulation, when feedback information of 0 is to be indicated via the HELTF symbol, a value of +1 is transmitted over the first subset $set_1$ of tones and a value of +1 is transmitted over the second subset $set_2$ of tones; and when feedback information of 1 is to be indicated via the HELTF symbol, a value of +1 is transmitted over the first subset $set_1$ of tones and a value of −1 is transmitted over the second subset $set_2$ of tones.

In an alternative scheme to process 300 in FIG. 3 for $N_{HELTF}=2$, for each user, 6 tones are allocated. Thus using 216 tones, a maximum number of 36 users can be supported. For each user, all 1s are sent on the first HELTF. On the subsequent HELTF, all 1s are sent if feedback information of 1 is indicated, and all −1s are sent if feedback information of 0 is indicated.

On the receiver side, the receiver computes a first power metric $P_1 = \Sigma_{k \in \{set1=set2\}} (y_{1k}+y_{2k})^2$, and a second power metric $P_0 = \Sigma_{k \in \{set1=set2\}} (y_{1k}-y_{2k})^2$, where $y_{1k}$ and $y_{2k}$ are the received symbols on the $k^{th}$ tone of the first and second HE-LTFs respectively. The receiver then decides that feedback information of 1 is indicated, if $P_1 > kP_0$, where k is usually between 0.5 and 0.75. Or else, if $P_0 > kP_1$, the receiver decides feedback information of 0 is indicated. Or else, if neither of the above two conditions is satisfied, the receiver decides a missed detection. In this way, the same channel can be used for both feedback information of 0 and 1, instead of partitioning the channel bandwidth into portions and using them asymmetrically as proposed by some existing systems. Hence decisions of 0 or 1 can be unbiased even when the channel conditions are unsatisfactory.

In the above alternative scheme, the tones allocated to each user can be further increased (e.g., >6) to provide increased robustness to spurious signals.

Figure 4:
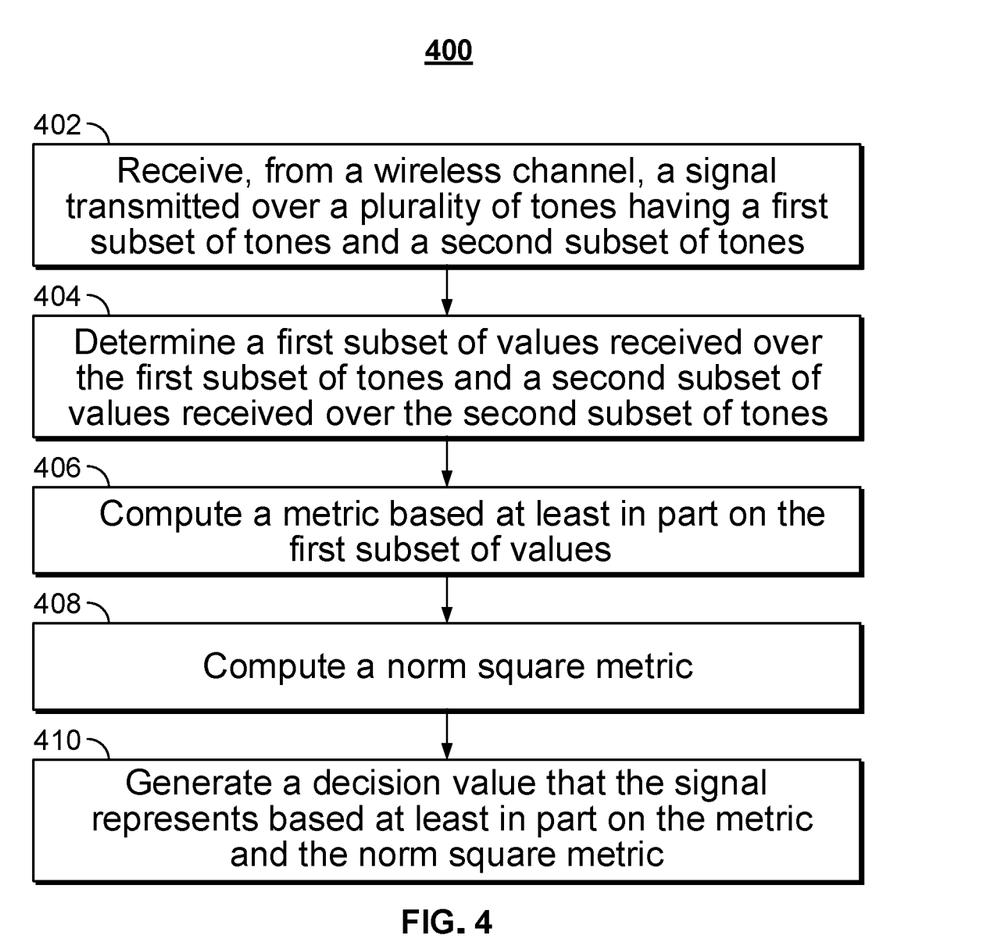
FIG. 4 provides an example logic flow diagram illustrating a decoding process at the receiver side that corresponds to the null data packet transmission described in FIG. 2, according to embodiments described herein.
Figure 5:
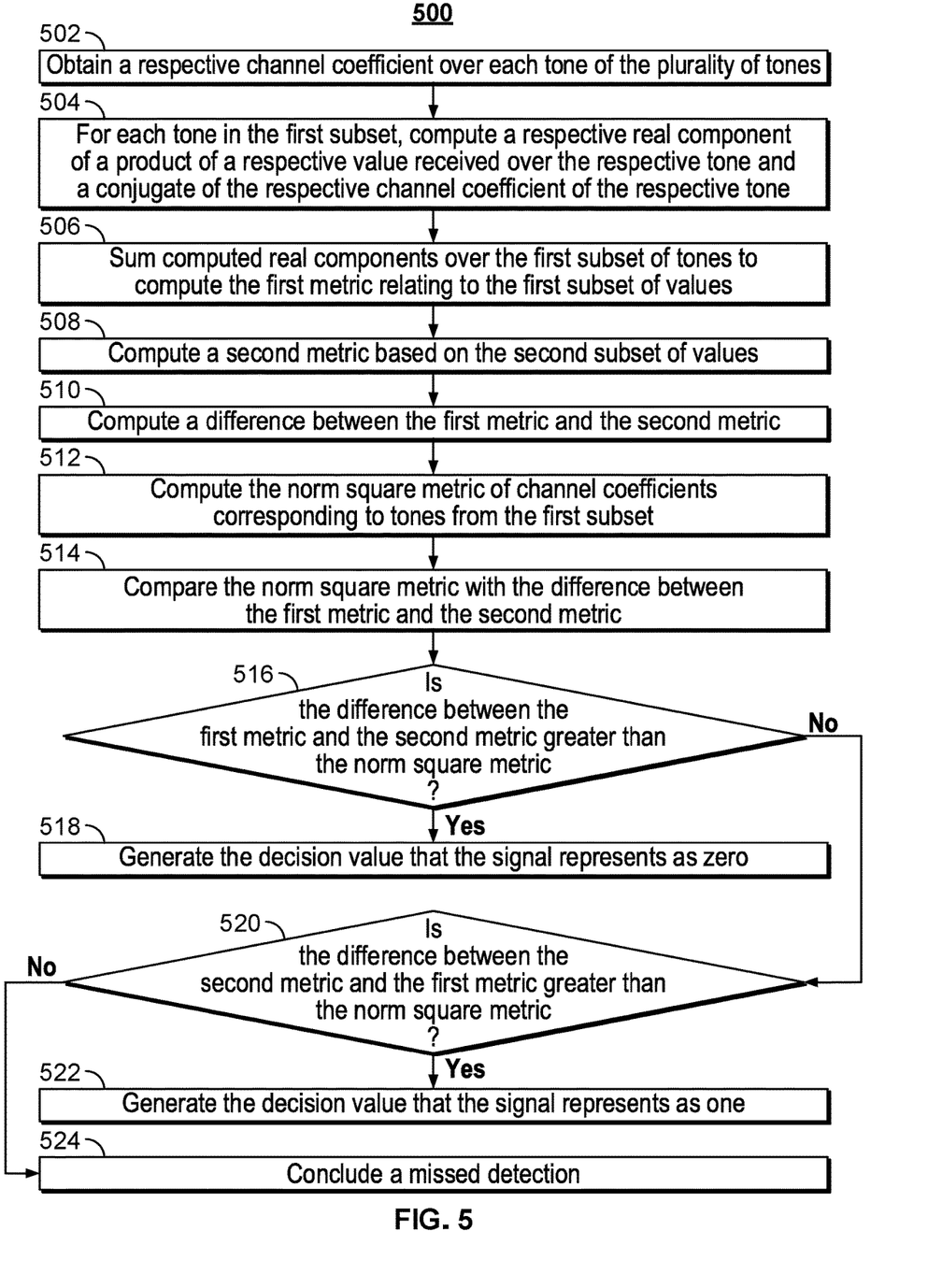
FIG. 5 provides an example logic flow diagram illustrating a decoding process at the receiver side that corresponds to the process described in FIG. 4, according to embodiments described herein.
Figure 6:
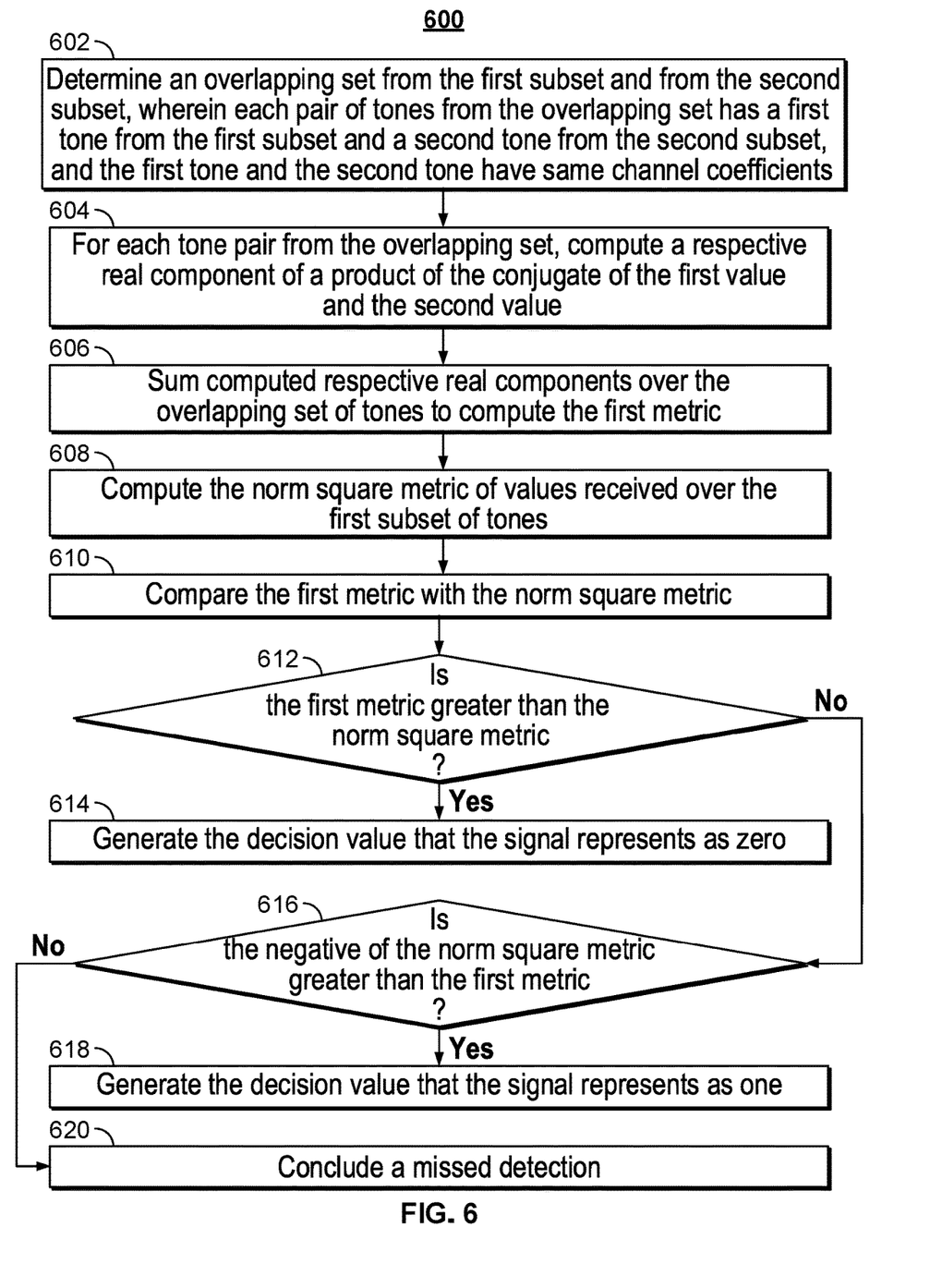
FIG. 6 provides an example logic flow diagram illustrating a decoding process corresponding to the NDP transmission scheme under D-BPSK described in FIG. 3, according to embodiments described herein.

FIGS. 4-6 provide example logic flow diagrams illustrating aspects of decoding processes at the receiver side corresponding to the various transmission schemes described in relation to FIGS. 2-3. FIG. 4 provides an example logic flow diagram illustrating a decoding process 400 at the receiver side that corresponds to the null data packet transmission described in FIG. 2, according to embodiments described herein. At 402, a receiver (at the AP) is configured to receive, from a wireless channel, a signal transmitted over the set of L tones having a first subset $set_1$ of tones and a second subset $set_2$ of tones. At 404, the receiver is configured to determine a first subset of values received over the first subset of tones, denoted as $\{y_k, k \in set\ 1\}$, and a second subset of values received over the second subset of tones, denoted as $\{y_k, k \in set\ 2\}$.

At 406, the receiver is configured to compute a metric based at least in part on the first subset of values $\{y_k, k \in set\ 1\}$. For example, the metric may indicate a total power level received over the $set_1$ tones. Various embodiments of metrics corresponding to the different transmission schemes described in FIGS. 2-3 are further described in relation to FIGS. 5-6. At 408, the receiver is configured to compute a norm square metric. The norm square metric may or may not involve channel state information and may serve as a threshold for determining whether feedback information of 0 or 1 is indicated in the received signal. Various different types of the norm square metric corresponding to the different transmission schemes described in FIGS. 2-3 are further described in relation to FIGS. 5-6.

At 410, the receiver is configured to generate a decision value that the signal represents based at least in part on the metric and the norm square metric. For example, the receiver may determine whether a bit of 0 or 1 is indicated by the received signal by comparing the first metric and the norm square metric, as further described below in regard to FIGS. 5-6.

FIG. 5 provides an example logic flow diagram illustrating a process 500 for 406-410 in FIG. 4 according to the transmission scheme described in FIG. 2, where a value of +1 is transmitted over $set_1$ tones and a value of −1 is transmitted over $set_2$ tones to indicate a feedback information bit of 0, and a value of −1 is transmitted over $set_1$ tones and a value of +1 is transmitted over $set_2$ tones to indicate a feedback information bit of 1, and where a first HELTF is modulated to serve as reference for subsequent HELTFs carrying feedback information. At 502, the receiver is configured to obtain a respective channel coefficient over each tone of the set of tones, denoted by $\{h_k, k \in set\ 1\}$, from a first HELTF. At 504, the receiver is configured to compute, for each tone in the first subset $set_1$, a respective real component of a product of a respective value received over the respective tone and a conjugate of the respective channel coefficient of the respective tone. At 606, the receiver is configured to sum the computed real components over the first subset $set_1$ of tones to compute the first metric relating to the first subset of values. For example, the first metric is computed by $$m_1 = \Sigma_{k \in set\ 1} Re(h_k^* y_k)$$

wherein $m_1$ is the first metric, k represents an index for each respective tone, $h_k^*$ represents the conjugate of the respective channel coefficient of a respective tone, and $y_k$ represents the respective value received over the respective tone in a subsequent HELTF.

At 508, the receiver is configured to compute a second metric based on the second subset of values received over the second subset $set_2$ of tones in a similar manner as described in 502-506. For example, the second metric may be computed by:

$$m_2 = \Sigma_{k \in set\ 2}\ Re(h_k^* y_k)$$

wherein $m_2$ is the second metric.

At 510, the receiver is configured to compute a difference between the first metric and the second metric. For example, the difference may be computed by:

$$diff_1 = m_1 - m_2$$

$$diff_2 = m_2 - m_1$$

At 512, the receiver is configured to compute the norm square metric of channel coefficients corresponding to tones from the first subset. For example, the norm square metric may be computed by:

$$n = \Sigma_{k \in set\ 1}\ Re(h_k^* h_k)$$

wherein n represents the norm square metric.

At 514, the receiver is configured to compare the norm square metric with the difference between the first metric and the second metric. For example, the receiver may determine whether the difference satisfies one of the following:

$$(m_1 - m_2) > a^* n$$

$$(m_2 - m_1) > a^* n$$

wherein a is a numeric coefficient. For example, a may be a value between 0.5 and 0.75.

At 516, the receiver is configured to determine whether the difference between the first metric and the second metric is greater than the norm square metric, i.e., $(m_1-m_2) > a^*n$. If the receiver determines the difference between the first metric and the second metric is greater than the norm square metric, process 500 proceeds to 518. Alternatively, process 500 proceeds to 520.

At 518, the receiver is configured to generate the decision value that the signal represents as zero. when $(m_1-m_2) > a^*n$.

At 520, the receiver is configured to determine whether a difference between the second metric and the first metric is greater than the norm square metric, i.e., $(m_2-m_1) > a^*n$. If the receiver determines the difference between the second metric and the first metric is greater than the norm square metric, process 500 proceeds to 522. Otherwise, process 500 proceeds to 524.

At 522, the receiver is configured to generate the decision value that the signal represents as one when $(m_2-m_1) > a^*n$.

At 524, the receiver is configured to conclude a missed detection for the received signal.

In some embodiments, when a value of 0.5 is transmitted over $set_1$ tones and $set_2$ tones to indicate a bit of 0, and a value of 1 is transmitted over $set_1$ and a value of 0 is transmitted over $set_2$ to indicate a bit of 1, the $set_1$ tones and $set_2$ tones are on the same LTF symbol. In this case, the receiver is configured to compute the metric as the sum of power of difference of values received on $set_1$ and $set_2$. The receiver then compares the computed power with a two-tier threshold mechanism. When the power is greater than a first threshold, the receiver decides a bit of 1. When the power is less than the second threshold, the receiver decides a bit of 0. If the power is between the first threshold and the second threshold, the receiver concludes a missed detection. The first threshold and the second threshold are pre-defined and usually the second threshold is less than the first threshold.

FIG. 6 provides an example logic flow diagram illustrating a decoding process 600 corresponding to the NDP transmission scheme under D-BPSK described in FIG. 3. At 602, a receiver is configured to determine an overlapping set from the first subset $set_1$ and from the second subset $set_2$, denoted {k∈set 1=set 2}, wherein each pair of tones from the overlapping set has a first tone from the first subset and a second tone from the second subset, and the first tone and the second tone have same channel coefficients. At 604, the receiver is configured to compute, for each tone pair from the overlapping set, a respective real component of a product of a conjugate of a first value of a respective first tone and a second value of a respective second tone. At 606, the receiver is configured to sum computed respective real components over the overlapping set of tones to compute the first metric. For example, the metric is computed by:

$$m = \Sigma_{k \in set\ 1 = set\ 2}\ Re(y_{1,k}^* y_{2,k})$$

wherein $y_{1,k}^*$ represents the conjugate of the received value on the $k^{th}$ tone in the first subset, and $y_{2,k}$ represents the received value on the $k^{th}$ tone in the second subset.

At 608, the receiver is configured to compute the norm square metric of values received over the first subset of tones. In some embodiments, the receiver is configured to compute the norm square metric of values received over the second subset of tones. The receiver may compute the norm square metric by:

$$n = \Sigma_{k \in set\ 1} y_{1,k}^* y_{1,k}$$

At 610, the receiver is configured to compare the first metric with the norm square metric. The receiver may perform the comparison with each or either of the following comparisons:

$$m > a^* n$$

$$m < -a^* n$$

wherein a is a numeric coefficient (e.g., between 0.5 and 0.75).

At 612, the receiver is configured to determine whether the norm square metric is greater than the first metric. If the receiver determines the first metric is greater than the norm square metric, e.g., $m > a^*n$, process 600 proceeds to 614. Alternatively, process 600 proceeds to 616.

At 614, the receiver is configured to generate the decision value that the signal represents as zero.

At 616, the receiver is configured to determine whether the negative of the norm square metric is greater than the first metric, e.g., $m < -a^*n$. If the receiver determines the negative of the norm square metric is greater than the first metric, process 600 proceeds to 618. Alternatively, process 600 proceeds to 620.

At 618, the receiver is configured to generate the decision value that the signal represents as one.

At 620, the receiver is configured to conclude a missed detection for the received signal.

In some embodiments, an alternative method may be used to decode the NDP transmission under D-BPSK described in FIG. 3. For example, a first metric is computed as:

$$m_1 = \Sigma_{k \in set\ 1 = set\ 2} (abs(y_{1,k} + y_{2,k}))^2$$

wherein abs( ) denotes a magnitude of the signal. Further, the receiver may compute a second metric by:

$$m_2 = \Sigma_{k \in set\ 1} (abs(y_{1,k}))^2 + \Sigma_{k \in set\ 2} (abs(y_{2,k}))^2$$

The receiver is then configured to determine a subset ("zero set") of zero tones that were used by the transmitter (usually chosen to be sparsely distributed across the set of tones) to transmit a known sequence in order to obtain noise estimation. The receiver may then compute the norm square metric with the following equation:

$$n=\Sigma_{k\in zero\ set}(\text{abs}(y_{1,k}))^2+\Sigma_{k\in zero\ set}(\text{abs}(y_{2,k}))^2$$

The receiver may then compare the first or second metric with the norm square metric. For example, if $m_2 < a_1*n$, the receiver may determine a missed detection. If $m_1 > a_2*m_2$, the receiver may determine that feedback information of 0 is indicated; or if $m_1 < a_2*m_2$, the receiver may determine that feedback information of 1 is indicated.

In some embodiments, the receiver may process the received signal for spur reduction. For example, on-chip coupling degradation may cause a few tones to carry a spurious signal. As the frequency (tone) at which the spur signal exists is generally detectable, a band-stop filter can be used at the receiver to rule out the spurious signal before signal estimation. For example, the band-stop filter h may take a form similar to the following:

$$h = \begin{bmatrix} \left(1-\frac{1}{M}\right) \\ -\frac{1}{M}\exp(j2\pi f_0 T_S) \\ -\frac{1}{M}\exp(j2\pi f_0 T_S \cdot 2) \\ \vdots \\ -\frac{1}{M}\exp(j2\pi f_0 T_S(M-1)) \end{bmatrix}$$

wherein M is the length of the filter (e.g., M=32), and $T_s$ represents the sampling period.

In another embodiment, if the same user info is transmitted on multiple HELTF symbols, different tone mapping can be assigned to different HELTFs for diversity against spurs. For example, when tone mapping can be different per HELTF symbol, the tones that carry spurious signals are different for each HELTF symbol, and thus the effect of the spurious signals on signal estimation may be evened out.

For small spurs (e.g., when the magnitude of the spur is below or around noise floor), a number $N_s$ (e.g., $N_s$ is usually less than the total number of spurs) of samples having the highest magnitudes are skipped while computing power metrics, e.g., $P_0$ and $P_1$.

Another example to rule out small spurs is to modify the receiver side processing. For example, in the scenario when $N_{ss}=2$ as described in relation to FIG. 3, power metrics $P_0$ and $P_1$ computation can be adjusted as $P_1=\text{median}(\{|y_{1k}+y_{2k}|^2\}, k\in\{set1=set2\})$, $P_0=\text{median}(\{|y_{1k}-y_{2k}|^2\}, k\in\{set1=set2\})$.

The NDP transmission scheme can be applied with user scheduling by the AP. For uplink multiple-input multiple-output (MIMO), AP decides which users are to be grouped and scheduled for receiving their respective UL transmission. For each of the transmission schemes discussed throughout this disclosure, the AP may schedule only those users in a system whose received signal strength indication (RSSI) is greater than $RSSI_{TH}$, where $RSSI_{TH}$ is a user-defined threshold of RSSI. In this way, only users whose RSSI at the AP is greater than a particular threshold are scheduled for transmission of "Short NDP based feedback," in turn avoiding automatic gain control (AGC) and analog-to-digital conversion (ADC) related limitations at the AP.

Figure 7:
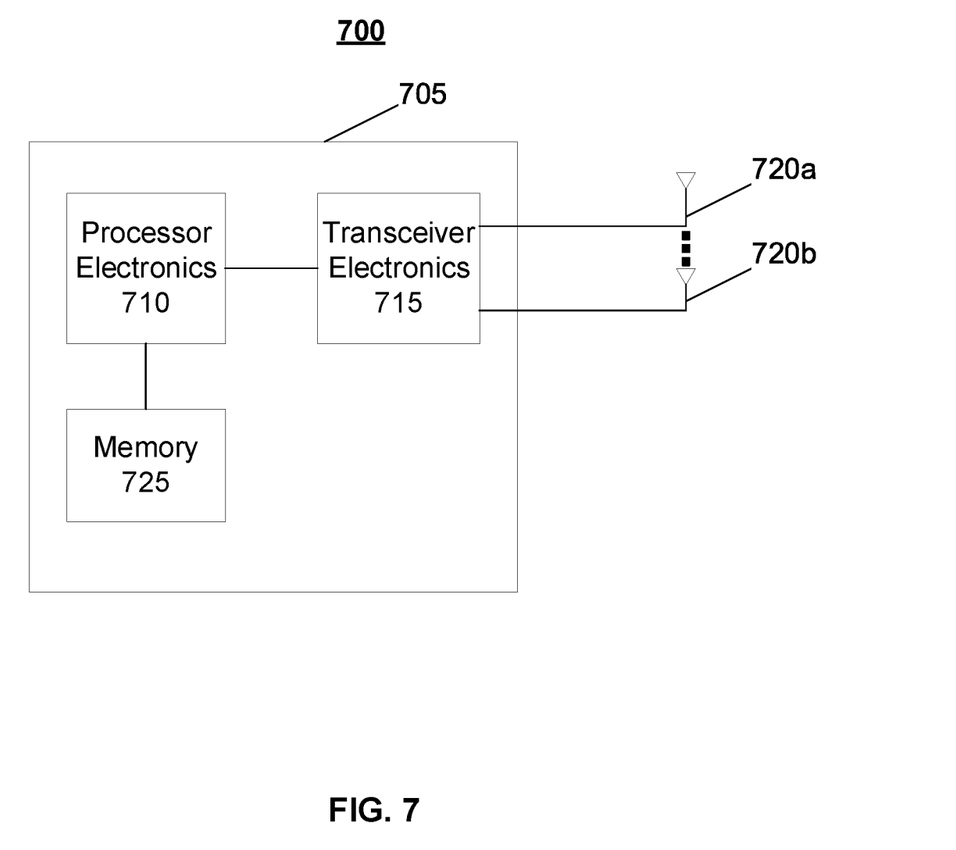
FIG. 7 shows a simplified block diagram of an example of a wireless communication device, according to embodiments described herein.

FIG. 7 shows a simplified block diagram 700 of an example of a wireless communication device 705, according to embodiments described herein. Various examples of device 705 include an AP, a base station (BS), a client device, an access terminal (AT), a client station, or a mobile station (MS), and/or the like. For example, the device 705 can represent the access point or the client device discussed throughout FIGS. 1-6.

The device 705 can include processor electronics 710 such as one or more processors that implement methods effecting the techniques presented in this disclosure. The processor electronics 710 can be operable to execute computer-readable instructions that, when executed on the processor electronics 710, cause the device 705 to implement methods (e.g., processes 200-600) effecting the techniques presented in this disclosure. For example, the processor electronics 710 can determine what value to be transmitted over a subset of tones depending on whether a bit of 0 or 1 is indicated by the HELTF symbol.

The device 705 can include transceiver electronics 715 (e.g., a transmitter, receiver, or transceiver) to send and/or receive wireless signals over one or more antennas 720a-720b. In some embodiments, transceiver electronics 715 can include multiple radio units. In some embodiments, a radio unit includes a baseband unit (BBU) and a radio frequency unit (RFU) to transmit and receive signals. In some embodiments, the device 705 includes dedicated circuitry for transmitting (e.g., a dedicated transmitter) and dedicated circuitry for receiving (e.g., a dedicated receiver). For example, transceiver electronics 715 can include one or more receivers that receive one or more signals from one or more antennas 720a-720b, transmitted over one or more WLAN channels. The transceiver antennas 720a-b and the transceiver electronics 715 are configured to The device 705 can include one or more memories configured to store information such as data and/or instructions (e.g., computer-readable instructions that cause the device 705 to implement methods effecting the techniques presented in this disclosure.

Various embodiments discussed in conjunction with FIGS. 1-7 are performed by various electronic components of one or more electronic circuits, such as but not limited to an integrated circuit, application-specific integrated circuit (ASIC), DSP, and/or the like. Various components discussed throughout this disclosure such as, but not limited to network devices (e.g., wireless AP, LP devices discussed in relation to FIGS. 1-7), and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for null data packet transmission, the method comprising:
   obtaining an information symbol for transmission in a null data packet;
   obtaining a set of tones, from among a plurality of tones, for transmitting the information symbol;
   dividing the set of tones into a first subset of tones and a second subset of tones;
   transmitting a first value over the first subset of tones and a second value over the second subset of tones to indicate a feedback information bit of zero from the information symbol;
   transmitting a third value over the first subset of tones and a fourth value over the second subset of tones to indicate a feedback information bit of one from the information symbol;
   adopting two or four High Efficiency Long Training Fields;
   allocating the first subset of tones on a first High Efficiency Long Training Field to transmit a first value;
   allocating the second subset of tones on a second High Efficiency Long Training Field to transmit a second value;
   dividing the first subset of tones into a first sub-subset and a second sub-subset and the second subset of tones into a third sub-subset and a fourth sub-subset; and
   modulating the information symbol onto the set of tones using on-off keying by:
      transmitting a value of one over the first sub-subset of tones, a value of zero over the second sub-subset of tones, a value of zero over the third sub-subset of tones and a value of one over the fourth sub-subset of tones when a feedback information bit from the information symbol is zero; and
      transmitting a value of zero over the first sub-subset of tones, a value of one over the second sub-subset of tones, a value of one over the third sub-subset of tones and a value of zero over the fourth sub-subset of tones when the feedback information bit from the information symbol is one.

2. A method for null data packet transmission, the method comprising:
   obtaining an information symbol for transmission in a null data packet;
   obtaining a set of tones, from among a plurality of tones, for transmitting the information symbol;
   dividing the set of tones into a first subset of tones and a second subset of tones;
   transmitting a first value over the first subset of tones and a second value over the second subset of tones to indicate a feedback information bit of zero from the information symbol;
   transmitting a third value over the first subset of tones and a fourth value over the second subset of tones to indicate a feedback information bit of one from the information symbol;
   adopting two or four High Efficiency Long Training Fields;
   allocating the first subset of tones on a first High Efficiency Long Training Field to transmit a first value;
   allocating the second subset of tones on a second High Efficiency Long Training Field to transmit a second value; and
   modulating the information symbol onto the set of tones using differential binary phase-shift keying by:
      transmitting a value of one over the first subset of tones and a value of one over the second subset of tones when a feedback information bit from the information symbol is zero; and
      transmitting a value of one over the first subset of tones and a value of minus one over the second subset of tones when the feedback information bit from the information symbol is one.

3. A method for null data packet transmission, the method comprising:
   obtaining an information symbol for transmission in a null data packet;
   obtaining a set of tones for transmitting the information symbol;
   dividing the set of tones into a first subset of tones and a second subset of tones;
   transmitting a first value over the first subset of tones and a second value over the second subset of tones to indicate a feedback in formation bit of zero from the information symbol; and
   transmitting a third value over the first subset of tones and a fourth value over the second subset of tones to indicate a feedback information bit of one from the information symbol,
   wherein the transmitting a first value over the first subset of tones and a second value over the second subset of tones to indicate a feedback information bit of zero from the information symbol and the transmitting a third value over the first subset of tones and a fourth value over the second subset of tones to indicate a feedback information bit of one from the information symbol comprises:
      transmitting a value of 0.5 over the first subset of tones and a value of 0.5 over the second subset of tones when a feedback information bit from the information symbol is zero; and
      transmitting a value of one over the first subset of tones and a value of zero over the second subset of tones when the feedback information bit from the information symbol is one,
   wherein the first subset of tones and the second subset of tones are both loaded on the information symbol.

4. A network device for null data packet transmission in a wireless local area network, the network device comprising:
   memory;
   a processor configured to:
      obtain an information symbol for transmission in a null data packet;
      obtain a set of tones, from among a plurality of tones, for transmitting the information symbol; and
      divide the set of tones into a first subset of tones and a second subset of tones; and a wireless transceiver configured to:
- transmit a first value over the first subset of tones and a second value over the second subset of tones to indicate a feedback information bit of zero from the information symbol;
- transmit a third value over the first subset of tones and a fourth value over the second subset of tones to indicate a feedback information bit of one from the information symbol;
- adopt two or four High Efficiency Long Training Fields;
- allocate the first subset of tones on a first High Efficiency Long Training Field to transmit a first value; and
- allocate the second subset of tones on a second High Efficiency Long Training Field to transmit a second value;
- divide the first subset of tones into a first sub-subset and a second sub-subset and the second subset of tones into a third sub-subset and a fourth sub-subset; and
- modulate the information symbol onto the plurality of tones using on-off keying by:
  - transmitting a value of one over the first sub-subset of tones, a value of zero over the second sub-subset of tones, a value of zero over the third sub-subset of tones and a value of one over the fourth sub-subset of tones when a feedback information bit from the information symbol is zero; and
  - transmitting a value of zero over the first sub-subset of tones, a value of one over the second sub-subset of tones, a value of one over the third sub-subset of tones and a value of zero over the fourth sub-subset of tones when the feedback information bit from the information symbol is one.

5. A network device for null data packet transmission in a wireless local area network, the network device comprising:
- memory;
- a processor configured to:
  - obtain an information symbol for transmission in a null data packet;
  - obtain a set of tones, from among a plurality of tones, for transmitting the information symbol; and
  - divide the set of tones into a first subset of tones and a second subset of tones; and
- a wireless transceiver configured to:
  - transmit a first value over the first subset of tones and a second value over the second subset of tones to indicate a feedback information bit of zero from the information symbol;
  - transmit a third value over the first subset of tones and a fourth value over the second subset of tones to indicate a feedback information bit of one from the information symbol;
  - adopt two or four High Efficiency Long Training Fields;
  - allocate the first subset of tones on a first High Efficiency Long Training Field to transmit a first value; and
  - allocate the second subset of tones on a second High Efficiency Long Training Field to transmit a second value; and
  - modulate the information symbol onto the set of tones using the differential binary phase-shift keying by:
    - transmitting a value of one over the first subset of tones and a value of one over the second subset of tones when a feedback information bit from the information symbol is zero; and
    - transmitting a value of one over the first subset of tones and a value of minus one over the second subset of tones when the feedback information bit from the information symbol is one.

6. A network device for null data packet transmission in a wireless local area network, the network device comprising:
- memory;
- a processor configured to:
  - obtain an information symbol for transmission in a null data packet;
  - obtain a set of tones for transmitting the information symbol; and
  - divide the set of tones into a first subset of tones and a second subset of tones; and
- a wireless transceiver configured to:
  - transmit a first value over the first subset of tones and a second value over the second subset of tones to indicate a feedback information bit of zero from the information symbol; and
  - transmit a third value over the first subset of tones and a fourth value over the second subset of tones to indicate a feedback information bit of one from the information symbol,
- wherein the wireless transceiver is further configured to transmit a first value over the first subset of tones and a second value over the second subset of tones to indicate a feedback information bit of zero from the information symbol and transmit a third value over the first subset of tones and a fourth value over the second subset of tones to indicate a feedback information bit of one from the information symbol by:
  - transmitting a value of 0.5 over the first subset of tones and a value of 0.5 over the second subset of tones when a feedback information bit from the information symbol is zero; and
  - transmitting a value of one over the first subset of tones and a value of zero over the second subset of tones when the feedback information bit from the information symbol is one,
- wherein the first subset of tones and the second subset of tones are both loaded on the information symbol.

* * * * *